April 27, 1926.

A. L. MONTGOMERY

SUBSOIL PLOW

Filed Feb. 20, 1923

INVENTOR
ADEN LESTER MONTGOMERY
BY Dewey, Strong
Townsend and Loftus
ATTORNEYS

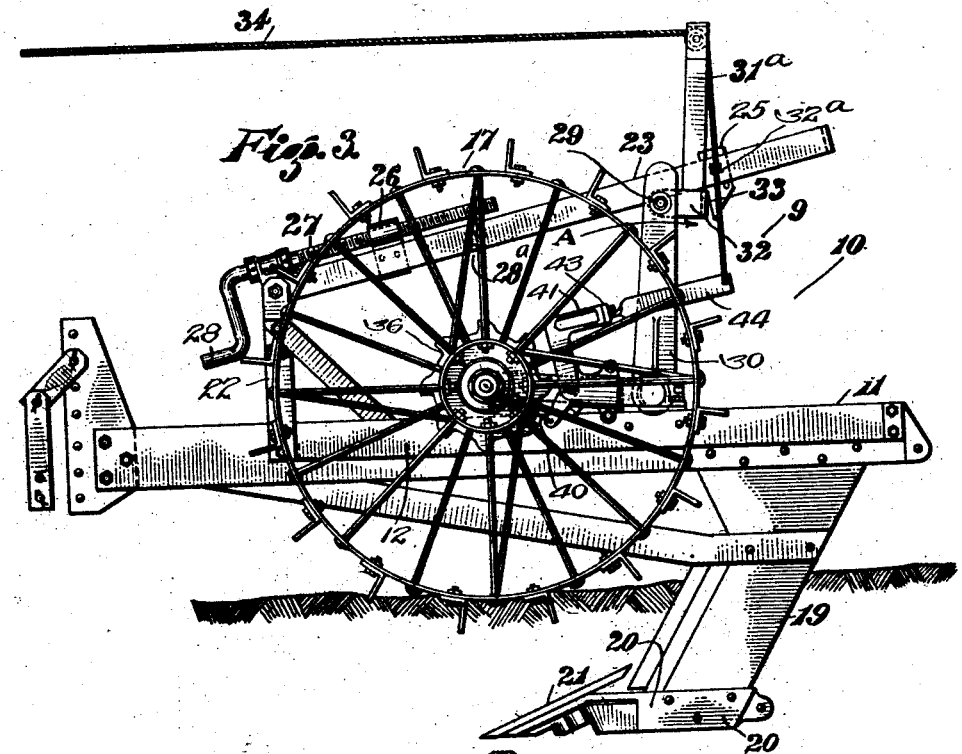
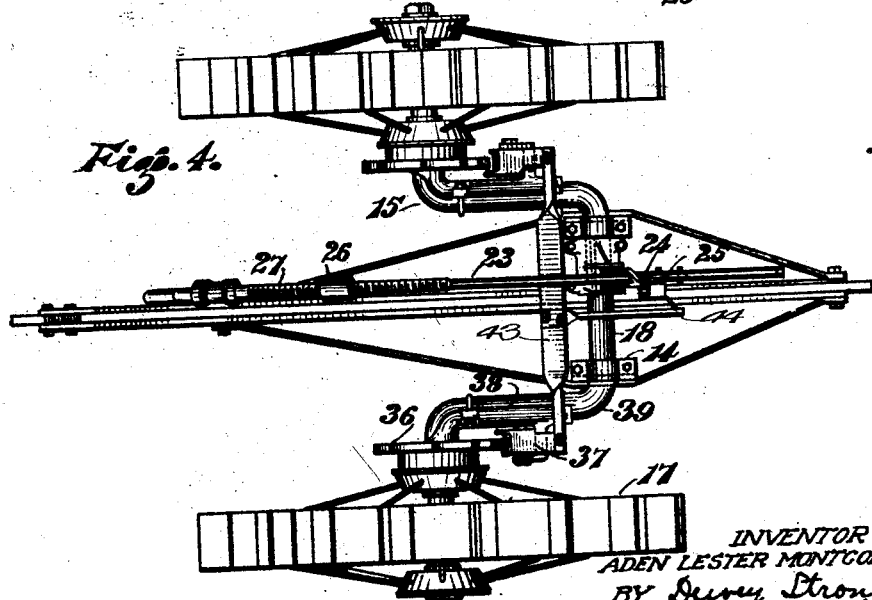

Patented Apr. 27, 1926.

1,582,418

UNITED STATES PATENT OFFICE.

ADEN LESTER MONTGOMERY, OF SAN JOSE, CALIFORNIA, ASSIGNOR TO HORACE G. KNAPP, OF SAN JOSE, CALIFORNIA.

SUBSOIL PLOW.

Application filed February 20, 1923. Serial No. 620,230.

*To all whom it may concern:*

Be it known that I, ADEN LESTER MONTGOMERY, a citizen of the United States, residing at San Jose, county of Santa Clara, and State of California, have invented new and useful Improvements in Subsoil Plows, of which the following is a specification.

This invention relates to agricultural implements and particularly pertains to what are commonly termed subsoil plows. These tools are employed to fracture the strata of hardpan usually occurring a distance below the surface of ground which has been regularly subjected to tillage.

It is the principal object of the present invention to provide a generally improved subsoil plow, designed to require but a minimum amount of draft and fitted with simple and efficient mechanism for lowering or raising the plow relative to the ground and for regulating the depth of cut of the tool.

The invention contemplates the use of a plow frame mounted upon wheels in a manner permitting it to be lowered relative to the wheels by gravity and what is known as the "suck" of the plow fin, or raised when not in motion by a hand lift and when in motion by a power lift depending for operation upon the forward motion of the implement. The mechanism for controlling the lowering and raising of the frame is arranged that it may be operated by a single means convenient to the driver of the tractor employed to draw the implement.

One form which the invention may assume is exemplified in the following description and illustrated by way of example in the accompanying drawings in which:—

Fig. 3 is a side elevation of the implement as seen when the plow is in engagement with the ground.

Fig. 4 is a plan view of the device as shown in the preceding figure.

Figure 1:
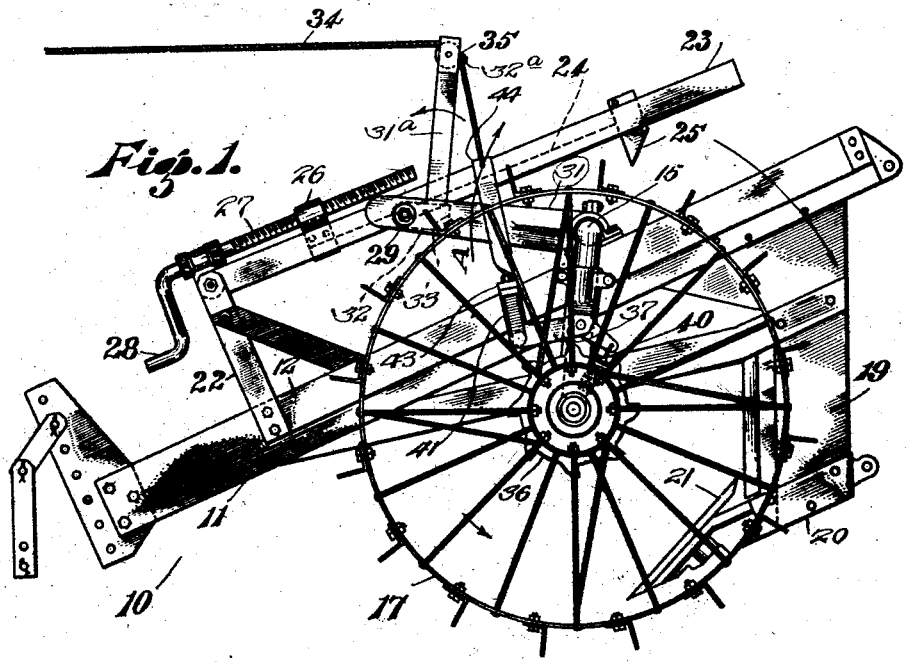
Fig. 1 is a side elevation of an agricultural implement embodying the present invention as seen when the plow is disposed clear of the ground.

Referring more particularly to the accompanying drawings, 9 indicates a subsoil plow adapted for use in penetrating the soil to a depth sufficient to break up the strata of hardpan that forms beneath the surface of soil that has been regularly subjected to tillage.

This strata has been found detrimental to the successful cultivation of crops and is located at a depth exceeding that reached by ordinary plows. However, the depth of this strata of hardpan varies according to conditions and it is necessary, therefore, to construct the subsoil plow to cut at varied depths with equal efficiency and amount of draft.

In the present instance the implement is constructed with a frame or plow beam 10 formed of a central beam 11 and side braces 12. The ends of the side braces 12 converge toward the central beam and are rigidly connected thereto. The side braces are fitted with bearings 14 for the reception of an axle 15. This axle is U-shaped and is formed with horizontal end portions 16 upon which wheels 17 are rotatably mounted. It is seen that the horizontal base section 18 of the U-shaped portion of the axle is the part which is mounted in the bearings. It is obvious, therefore, that turning movement of the axle will affect the position of the frame relative to the wheels.

The axle, as shown, is mounted above the beam or frame 10. This prevents the accumulation of clogs of earth under the beam which would act to retard the implement.

Extending downwardly from the beam is a standard 19 which is fitted at its lower end with a land shoe 20. The forward end of this shoe is formed to serve as a mounting for a plow fin or blade 21. This fin is the cutting tool and is mounted at an angle to the horizontal so that it will have sufficient suck, or in other words a tendency to burrow into the soil when the implement is drawn forwardly. Both ends of this tool are sharpened so that it may be reversed, thus lengthening its period of usefulness.

The standard 19 is rigidly secured at its upper end to the central beam 11 of the plow frame 10 and extends downwardly at an acute angle to the beam or frame. This arrangement, together with the fact that the front edge of the standard 19 is knife-like, results in giving a shearing effect when the standard is drawn through the ground, requiring but a minimum amount of traction power.

To permit the plow to lower into the ground and regulate the depth of cut, a latch mechanism 21$^a$ is provided. This mechanism comprises a vertical member 22 rigidly connected to the plow frame. The upper end of this member is pivotally connected to the front end of a pair of latch bars 23, which are arranged parallel at a spaced distance apart and are secured together at their ends. The spacing between the bars is sufficient to accommodate a sliding gage member 24 having a stop member 25 secured at its rear extremity. This gage member is slidable between the latch bars, and its front end is fitted with a feed nut 26, which threadedly engages a feed screw 27 mounted above the latch bars for turning movement only. This screw may be rotated by means of a hand crank 28. It is seen that by operating the feed screw 27, the position of the stop member 25 may be moved longitudinally between the latch bars.

Figure 2:
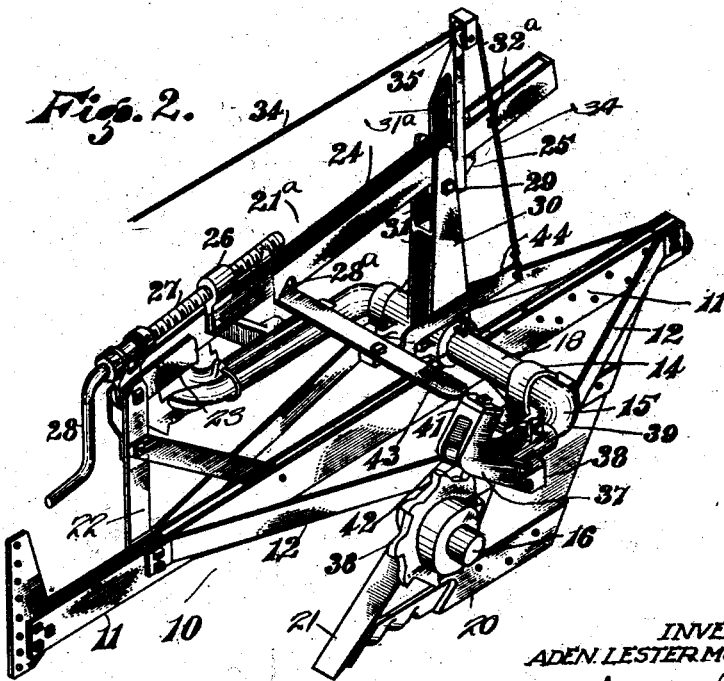
Fig. 2 is a fragmentary view in perspective disclosing the construction and arrangement of the mechanism of the implement.

The lower edges of the latch bars 23 are formed with aligned notches 28$^a$ which are adapted to accommodate a pin or bolt 29 fixed adjacent the upper end of an axle lever 30. This lever is formed of two connected side portions 31 which embrace the latch bars as shown in Fig. 2. The lever is also provided with a trip lever 31$^a$ which is fitted at its lower end with a bail shaped yoke 32, the ends of which pivot about the pin 29. The base section 33 of the yoke engages the lower edges of the latch bars 23, so that when the mechanism is in normal position, forward shifting movement of the yoke will raise the rear end of the latch bars.

Reference being had to Fig. 1, it will be seen that the pin 29 is in engagement with the notches 28$^a$ in the latch bars 23. As the lower end or hub of the axle lever 30 is keyed to the axle and the upper end thereof carries the pin 29, the engagement mentioned latches the axle in position relative to the frame. In this position the fin or plow point 21 is maintained out of engagement with the ground. The latch mechanism just described is controlled by a cable or rope 34 which may be led to a point convenient to the tractor used for drawing the plow. This cable is led over a pulley 35 mounted at the upper end of the trip lever 31, and is knotted as at 32$^a$. This knot cannot pass over the pulley and, therefore, when a pull is exerted on the rope, the trip lever 31$^a$ is swung forwardly. This movement of the lever 31$^a$ causes the yoke 32 at its lower end, to raise the latch bars and discontinue the engagement between the notches 28$^a$ and the pin 29.

The weight of the plow frame and the auxiliary mechanism is so distributed that upon release of the latch engagement, the rear end of the plow frame will lower and the fin or blade will engage the ground. When the implement is in forward motion the so-called suck of the blade will cause it to penetrate the ground to the full depth desired. This depth is regulated by the stop member 25 on the gage member 24. In other words, the frame and axle will assume the positions substantially as shown in Fig. 3.

As the axle lever 30 is keyed to the axle when the frame lowers, the lever 30 will be forced to swing in the direction of the arrow "A" shown in Fig. 1. The lever 30 may continue to swing in this direction until the yoke 32 on the lower end of the trip lever 31$^a$ engages the stop member 25 on the gage member. It is thus seen that by adjusting the position of the stop member 25 the depth of cut may be regulated as desired.

The implement is provided with a power lift mechanism which depends upon forward motion of the implement for operation. This power lift comprises ratchet wheels 36 fixed to the hubs of the ground wheels 17 and pawls 37 pivotally mounted on bearings 38 fixed on the legs 39 of the axle. These pawls are mounted one adjacent each ratchet wheel 36 and are normally held out of engagement therewith by springs 40.

Reference being had to Fig. 2, it is seen that the pawls are angular in shape, the upper portion being bifurcated as at 41 to support a pin 42.

The upper ends of the pawls are connected by a horizontal bar 43 so that they may be operated in unison by a control lever 44 rigidly connected at one end to the bar 43. The other end of the lever 44 is connected to the end of the control rope 34 and it is intended that a pull exerted on this rope will swing the pawls to place the pins 42 thereon into engagement with the ratchet wheels. As the ratchet wheels revolve in unison with the ground wheels, and one end of the pawls connects with the legs 39 of the axle, the engagement mentioned causes the U-portion of the axle to swing in unison with the ratchet wheels until the bar 43 engages the frame and discontinues the engagement between the pawls and ratchet wheels. This distance is sufficient to re-establish the engagement between the pins 29 on the axle lever 30 and the notches 28$^a$ on the latch bars 23. This engagement, as described, maintains the plow frame in raised or inoperative position.

In operation of the device, it will be assumed that a tractor is connected to the front thereof for drawing the same. When the depth of cut desired is determined, the feed screw 27 may be rotated by means of the hand crank 28 to set the stop member 25. The rope 34 may then be pulled to raise the latch bars 23 through the medium of the trip lever 31 and its yoke 32 to release the latching engagement between the notches 28ª in the latch bars 23 and the pin 29 in the axle lever 30. The weight of the mechanism will then cause the plow frame to lower and engage the plow fin 21 with the ground. Continued forward movement of the plow will cause the fin to burrow into the ground to the full depth permitted by the position of the stop member 25.

When it is desired to raise the fin 21 from the ground when the plow is in motion, a pull is exerted on the cable 34 to engage the pawls 37 with the ratchet wheels 36. As the ratchet wheels 36 turn in unison with the ground wheels 17 and the pawls are connected to the legs 39 of the axle, the engagement mentioned causes the axle to turn in unison with the wheels and raise the plow frame. When the frame is raised to proper position, the bar 43 engages the frame and automatically disengages the pawls from the ratchet wheels. At this point, the pin 29 has engaged the notches 28ª in the latch bars and prevents the frame from lowering.

When not in motion, the frame may be raised by revolving the feed screw 27 until the stop member 25 has returned the upper end of the axle lever 30 to a position where the pin 29 may engage the notches 28ª. The lever 30 is, as described, keyed to the axle and, therefore, when it is swung by the member 25, the axle is turned to raise the frame accordingly.

Prior to the present invention, the standards of the subsoil plows in use were mounted at right angles to the plow frame. The front edge of the standards set at this angle, offered considerable resistance when drawn through the ground. This resistance increased accordingly as the fin burrowed deeper into the ground. By mounting the standard 19 at an acute angle to the frame, I overcome this resistance and considerably reduce the amount of draft necessary. In actual practice, I have found that the sharpened front edge and the angle the standard is set gives shearing effect offering but slight resistance.

From the foregoing, it is obvious that a generally improved subsoil plow has been provided, and it is to be understood that while I have shown and described the preferred form of the invention, various changes in the construction and combination of the parts may be made without departing from the spirit of the invention.

Having thus described my invention, what I claim and desire to secure by Letters Patent is:—

1. In combination with a plow frame, a crank axle having its transverse portions journalled on the frame, said axle carrying ground wheels at its ends whereby turning movement imparted thereto will raise or lower the frame relative to the wheels, an arm secured to the axle, a latch bar pivoted at its front end to the plow frame and extending longitudinally of the plow, cooperating latch means on said latch bar and said swinging arm for latching said arm in a position mintaining the frame in a raised or inoperative position, operable means for disengaging said latch means to permit the axle to turn and lower the frame, and adjustable means carried by said latch bar for engaging said swinging arm to limit the turning movement of the axle.

2. In combination with a plow frame, a crank axle having its transverse portions journalled on the frame, said axle carrying ground wheels at its ends whereby turning movement imparted thereto will raise or lower the frame relative to the wheels, an arm secured to the axle, a latch bar pivoted at its front end to the plow frame and extending longitudinally of the plow, cooperating latch means on said latch bar and said swinging arm for latching said arm in a position maintaining the frame in a raised or inoperative position, operable means for disengaging said latch means to permit the axle to turn and lower the frame, and adjustable means carried by said latch bar for engaging said swinging arm to limit the turning movement of the axle, said means being movable longitudinally of the plow and adapted to be manually operated to swing said arm and act therethrough to return the axle and frame to an inoperative or raised position.

3. In combination with a plow frame, a crank axle having its transverse portions journalled on the frame, said axle carrying ground wheels at its ends whereby turning movement imparted thereto will raise or lower the frame relative to the wheels, an arm secured to the axle, a latch bar above the plow frame and pivoted at its forward end to the frame and extending longitudinally of the plow, a latch pin carried by said swinging arm, said latch bar being formed with a notch engageable with said pin whereby the swinging arm may be latched in a position maintaining said plow frame raised, and a trip lever pivotally connected to said swinging arm and having means thereon engageable with said latch bar, whereby swinging movement of the trip lever will be accompanied by upward movement of the latch bar to disengage the latch pin from the notch in the latch bar whereby to release said arm to permit the axle to turn and lower the frame, a gage bar slidable longitudinally of the latch bar and having a stop member at its rear end engageable with the swinging arm, screw means engaging the gage bar to adjust its longitudinal position whereby to limit the downward movement of the frame upon the release of the swinging arm, said screw means being also capable of operation to move said stop member forwardly of the frame and to cause swinging movement of said arm and thereby raise the plow frame.

ADEN LESTER MONTGOMERY.